Patented Apr. 7, 1936

2,036,396

UNITED STATES PATENT OFFICE 2,036,396

TREATMENT OF MINERAL OILS

Leo P. Chebotar, Beacon, N. Y., assignor to The Texas Company, New York, N. Y., a corporation of Delaware No Drawing. Application February 27, 1932, Serial No. 595,666

3 Claims. (Cl. 196—29)

This invention relates to the treatment of mineral oils and has to do particularly with the removal of sulfur and gum-forming constituents from petroleum distillates by means of oxidizing agents.

According to the invention, the oil to be treated is contacted with a free oxygen-containing gas, such as air, in the presence of a soluble soap catalyst, for example an oil soluble metal salt of an organic acid, with or without the aid of a promoter of oxidation.

Oils suitable for treatment, according to the invention, may comprise any petroleum distillate encountered in refinery practice. The invention, however, is particularly applicable to the treatment of distillates having high sulfur content, such as those produced in refining certain Californian and Gulf Coastal crudes. Such distillates, including gasoline, naphtha and kerosene which contain too high sulfur content for marketable products, may be treated advantageously as herein described to reduce the sulfur content. Furthermore, certain cracked distillates which contain excessive amounts of sulfur as well as undesirable gum-forming constituents are equally well adapted for the process of the invention. It may also be desirable in some cases to treat lubricating oils according to my process to reduce the sulfur content and improve the odor thereof.

More particularly, according to the invention, the catalyst is dissolved in the oil to be treated to form a homogeneous solution. The oil is then contacted with air, oxygen, or other free oxygen-containing gas, by any suitable means, for example by blowing the air through a column of the liquid in an agitator. In the case of volatile liquids it may be desirable to treat the oil continuously in a closed system, say by flowing the oil countercurrent to the gas. The methods of gas-liquid contact are well known and a suitable apparatus may be adapted by one skilled in the art.

The raw oil may be treated as received from the stills; however, I prefer to give the oil an alkaline wash before oxidation. A 10–20° Bé. caustic solution has been found suitable although it will be understood that other aqueous alkalies which are capable of removing hydrogen sulfide and other materials that tend to poison the catalyst may be used. The oil is then given the oxidation treatment and the gaseous products of reaction are continuously carried away with excess gas released from the system. After the desulfurization or degumming treatment, the oil, in the same or other appropriate apparatus, may be given any of the well known refining treatments, such as acid treatment, clay filtration and sweetening. It will be understood that while my process may be used alone, it is most beneficial as a treatment supplementary to the usual refining process for the purpose of removing resistant sulfur compounds and for selectively destroying certain reactive gum-forming constituents of the oil.

The catalysts which may be used in the process comprise a number of oil soluble soaps or soluble metal salts of certain organic acids. The metals or metal constituents of the salts which have been found useful comprise manganese, cobalt, copper, nickel and lead and the acid constituents of the salt may be selected from such acids as oleic, resinic, naphthenic, etc., or any other acids which form soluble soaps with the aforesaid metals. Thus the oleates, resinates and naphthenates of manganese, cobalt, copper, nickel and lead have all been found to be active catalysts. In some cases, in order to promote or accelerate the effect of the catalyst it has been found advantageous to use certain promoters and for this purpose I have found pyridine bases especially reactive. Other promoters comprise hydroquinone, rosin, asphalt and certain organic acids, for example a slight excess of an acid corresponding to the acidic constituent of the soap, such as oleic or naphthenic acids.

The quantity of catalyst as well as the promoter may vary within quite wide limits. In general, however, I have found 0.02% to 0.2% by weight of the catalyst, and preferably about 0.05% by weight, to be satisfactory. The quantity of the promoter may range from 0.05% to 0.3% by weight and preferably about 0.15% by weight.

The temperature and pressure conditions for carrying out the process of the invention may vary somewhat, depending on the nature of the sulfur compounds in the oil under treatment. For the more resistant type of sulfur compounds it may be desirable to use an elevated temperature and perhaps superatmospheric pressure. I prefer, however, relatively low temperatures, such as 60° C. to 100° C. and approximately atmospheric pressure. In some instances it may be advantageous to use higher or lower temperatures than that given as the preferred range, for example from 20° C. to 200° C., and relatively high pressures, say of the order of 100 lbs.

The time of contact of the oxidizing gas with the oil in the presence of the catalyst depends on several variables, such as the nature of the oil, the temperature, the type of catalyst and the efficiency of the contact between the gas and liquid. Using a catalyst comprising copper naphthenate dissolved in naphtha and blowing with air in an agitator, the time required for the lower temperatures, say around 20° C., is about 60–100 hours. The time, however, is inversely proportional to the temperature and it has been found that the rate of reaction doubles for about every 10° C. increase in temperature. By raising the temperature, therefore, the time can be graduated to produce results in as short a time as possible for a given quality of the treated oils.

As an example of my process, 0.05% by weight of copper naphthenate is dissolved in a raw, caustic washed naphtha from Gulf Coastal crude, containing about 0.5% of sulfur. To the mixture is added 0.1% of pyridine and the mixture heated to about 80° C. and a stream of air passed therethrough for approximately 2 hours. The resultant product is then treated with about 6 lbs. per barrel of concentrated sulfuric acid, after which the acid treated oil is neutralized and distilled. The distillate is then sweetened and the sulfur content of the finished product is found to be reduced to about 0.1%, whereas a similar refining treatment but without the oxidation operation reduces the sulfur to only about 0.35%.

Obviously many modifications and variations of the invention, as hereinbefore set forth, may be made without departing from the spirit and scope thereof, and therefore only such limitations should be imposed as are indicated in the appended claims.

What I claim is:

1. In the refining of volatile liquid petroleum distillates of high refractory sulfur content, the steps which comprise adding to the oil to be treated about 0.05–0.3% of a promoter of oxidation from the class of pyridine and hydroquinone, and then contacting the oil, containing the oxidation promoter, with air while in the presence of an oil soluble soap of a metal from the group consisting of manganese, copper, cobalt, nickel and lead.

2. In the refining of petroleum distillates, of the class of gasoline and kerosene, which have a high sulfur content of refractory nature, the steps which comprise adding to the oil to be treated about 0.05–0.3% of an oxidation promoter of the class of pyridine and hydroquinone, and about 0.02–0.2% of an oil soluble soap of a catalytic metal from the group consisting of manganese, copper, cobalt, nickel and lead, and then contacting the oil, containing the oxidation promoter and the catalyst, with air at a temperature sufficiently high to cause a substantial reduction of the sulfur content.

3. In the refining of petroleum distillates, of the class of gasoline and kerosene, which have a high sulfur content of refractory nature, the steps which comprise incorporating into the oil to be treated about 0.1% of pyridine and about 0.05% of copper naphthenate and then contacting the resulting product with air at a temperature within the range of about 60°–100° C.

LEO P. CHEBOTAR.